(12) United States Patent
Honjo et al.

(10) Patent No.: US 10,668,799 B2
(45) Date of Patent: Jun. 2, 2020

(54) ROTARY ELECTRIC MACHINE UNIT

(71) Applicant: HONDA MOTOR CO., LTD., Tokyo (JP)

(72) Inventors: Satoshi Honjo, Saitama (JP); Hirofumi Suzumori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/269,725

(22) Filed: Feb. 7, 2019

(65) Prior Publication Data
US 2019/0248222 A1    Aug. 15, 2019

(30) Foreign Application Priority Data

Feb. 9, 2018    (JP) ................................. 2018-022416

(51) Int. Cl.
| | |
|---|---|
| H02K 5/24 | (2006.01) |
| H02K 11/33 | (2016.01) |
| B60K 6/405 | (2007.10) |
| B60K 1/00 | (2006.01) |
| B60K 1/02 | (2006.01) |

(52) U.S. Cl.
CPC ................ B60K 6/405 (2013.01); B60K 1/00 (2013.01); H02K 5/24 (2013.01); B60K 1/02 (2013.01); B60K 2001/001 (2013.01); B60Y 2304/03 (2013.01); B60Y 2304/05 (2013.01); B60Y 2306/09 (2013.01); H02K 11/33 (2016.01)

(58) Field of Classification Search
CPC ................................. H02K 5/24; H02K 11/33
USPC .............................................. 310/51, 88, 89
See application file for complete search history.

(56) References Cited

U.S. PATENT DOCUMENTS

| | | | | |
|---|---|---|---|---|
| 2008/0258569 | A1* | 10/2008 | Kano | ..................... B60K 6/445 310/51 |
| 2008/0261414 | A1* | 10/2008 | Mizutani | .............. H01R 13/533 439/34 |
| 2018/0022202 | A1 | 1/2018 | Urabe et al. | |

FOREIGN PATENT DOCUMENTS

| | | |
|---|---|---|
| CN | 203554202 U | 4/2014 |
| JP | S53-090907 A | 7/1978 |
| JP | 2000-060060 A | 2/2000 |
| JP | 2008-187754 A | 8/2008 |
| JP | 2009-303305 A | 12/2009 |
| WO | WO 2016/121032 A1 | 8/2016 |

OTHER PUBLICATIONS

Sep. 24, 2019, Japanese Office Action issued for related JP Application No. 2018-022416.

* cited by examiner

*Primary Examiner* — Jose A Gonzalez Quinones
(74) *Attorney, Agent, or Firm* — Paratus Law Group, PLLC

(57) ABSTRACT

A rotary electric machine unit includes a rotary electric machine, a case accommodating the rotary electric machine, a power control unit configured to control the rotary electric machine and mounted on the case by directly connecting a unit-side connector provided on a bottom surface of the power control unit to a case-side connector provided on an upper surface of the case; and a sound absorbing member provided between the upper surface of the case and the bottom surface of the power control unit.

5 Claims, 7 Drawing Sheets

ROTARY ELECTRIC MACHINE UNIT

CROSS-REFERENCE TO RELATED APPLICATIONS

The present application claims the benefit of priority of Japanese Patent Application No. 2018-022416, filed on Feb. 9, 2018, the content of which is incorporated herein by reference.

TECHNICAL FIELD

The present invention relates to a rotary electric machine unit to be mounted on an electric vehicle or the like.

BACKGROUND ART

Conventionally, an electric vehicle such as an electric automobile or a hybrid vehicle which travels by power of a rotary electric machine is provided with a power control unit (PCU) configured to control the rotary electric machine.

The power control unit includes an inverter which is connected between a battery and the rotary electric machine and converts a direct current voltage to an alternating voltage or an alternating current voltage to a direct current voltage.

In a conventional electric vehicle, a case accommodating the rotary electric machine and the power control unit are separately attached to a vehicle frame member, and the power control unit is connected to the rotary electric machine via a three-phase cable. Therefore, an attaching frame for the power control unit may be required, and also a noise may be generated from the three-phase cable.

WO 2016/121032 discloses a rotary electric machine unit in which a power control unit is directly mounted on a case accommodating a rotary electric machine. According to the rotary electric machine unit, since an attaching frame for the power control unit or a three-phase cable is not necessary, weight and cost of a vehicle body can be reduced, and also the occurrence of noise can be reduced.

However, in the rotary electric machine unit in which the power control unit is directly mounted on the case accommodating the rotary electric machine, radiation sound of the rotary electric machine may resonate between an upper surface of the case and a bottom surface of the power control unit, so that the radiation sound may be amplified.

SUMMARY

Accordingly, an aspect of the present invention provides a rotary electric machine unit which can suppress radiation sound of a rotary electric machine from being amplified by resonance.

According to an embodiment of the present invention, there is provided a rotary electric machine unit including:
a rotary electric machine;
a case accommodating the rotary electric machine; and
a power control unit configured to control the rotary electric machine and mounted on the case by directly connecting a unit-side connector provided on a bottom surface of the power control unit to a case-side connector provided on an upper surface of the case; and
a sound absorbing member provided between the upper surface of the case and the bottom surface of the power control unit.

Effect of the Invention

According to the above-described configuration, in the rotary electric machine unit including the power control unit mounted on the case accommodating the rotary electric machine, radiation sound of the rotary electric machine can be suppressed from resonating between the upper surface of the case and the bottom surface of the power control unit and the radiation sound can be suppressed from being amplified by the resonance.

DESCRIPTION OF EMBODIMENTS

Hereinafter, a rotary electric machine unit according to an embodiment of the present invention will be described with reference to the accompanying drawings.

[Rotary Electric Machine Unit]

Figure 1:
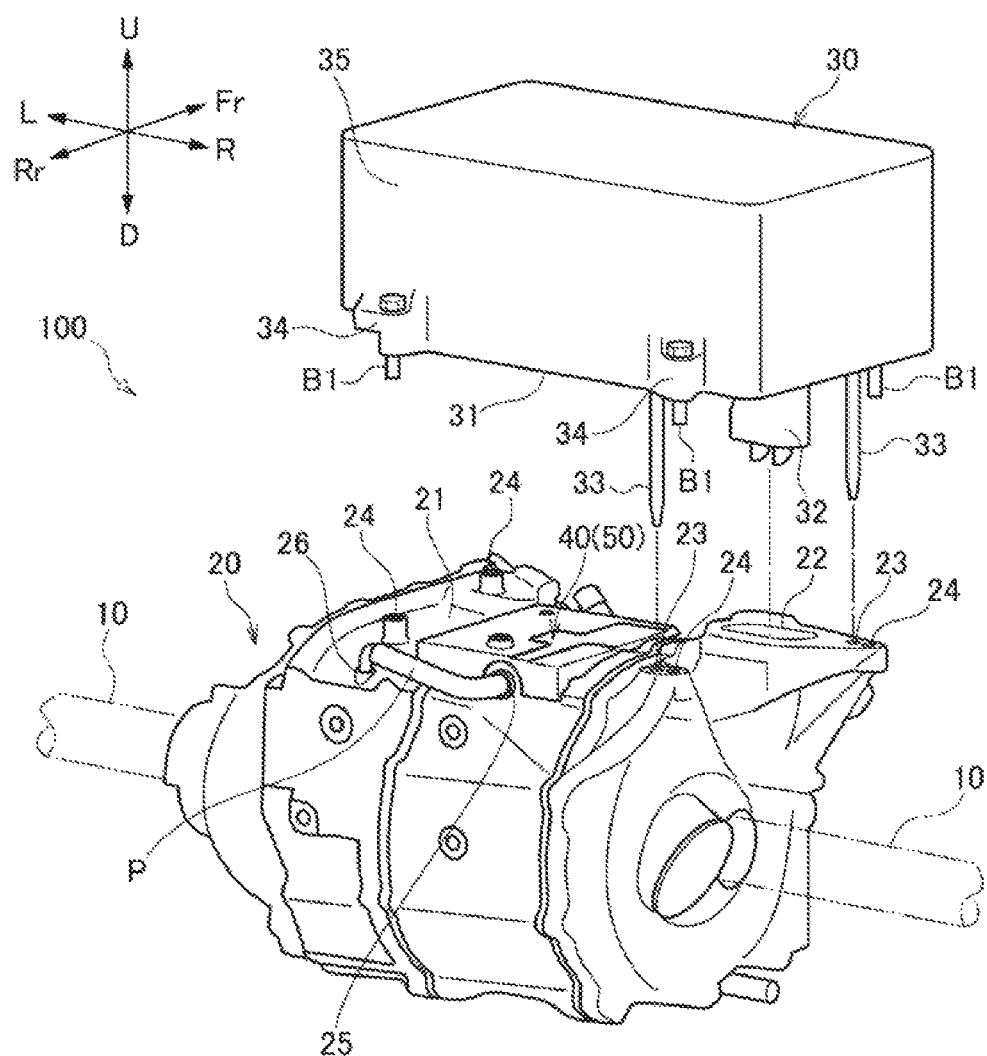
FIG. 1 is an exploded perspective view of a rotary electric machine unit according to an embodiment of the present invention as seen from a rear right upper side.
Figure 2:
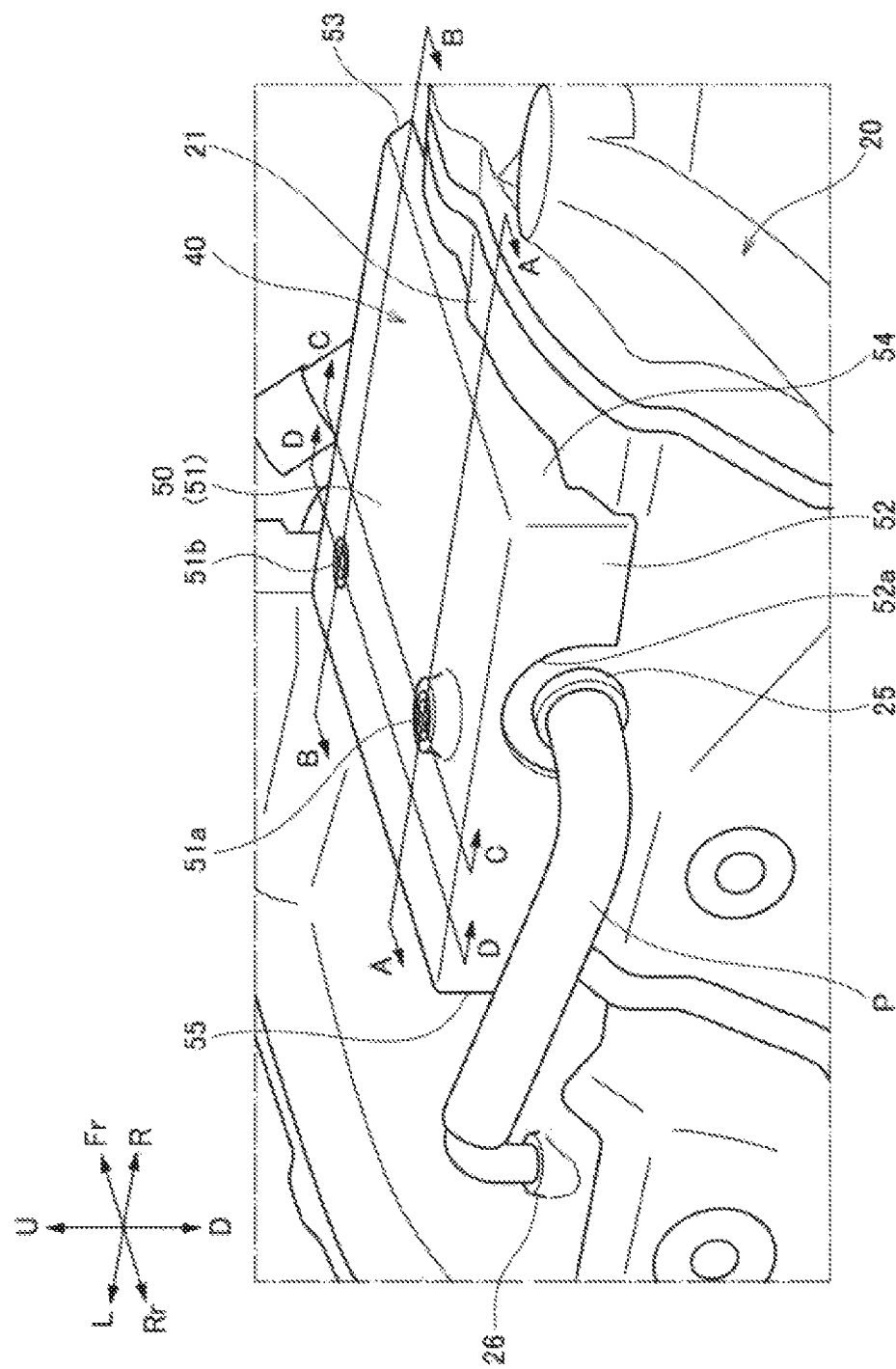
FIG. 2 is a perspective view of a sound absorbing member attached to a case of the rotary electric machine unit in FIG. 1 as seen from the rear right upper side.
Figure 3:
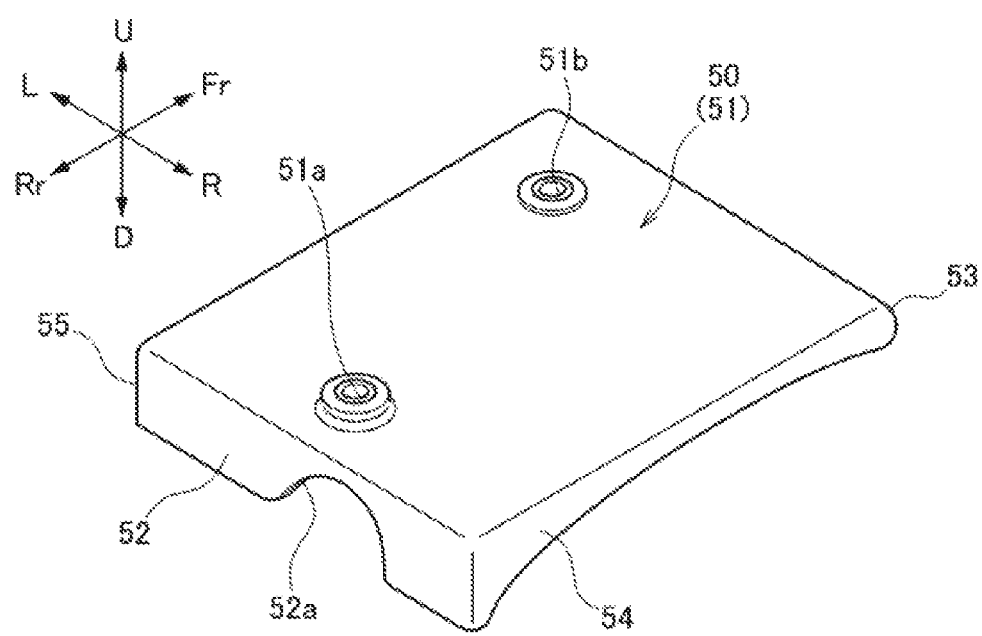
FIG. 3 is a perspective view of a partition cover of the sound absorbing member in FIG. 2 as seen from the rear right upper side.

As shown in FIG. 1, a rotary electric machine unit 100 according to an embodiment of the present invention includes a rotary electric machine 11 (refer to FIGS. 6A and 6B), a case 20 accommodating the rotary electric machine 11, and a power control unit 30 configured to control the rotary electric machine 11. Although the rotary electric machine unit 100 according to the present embodiment is mounted on an electric vehicle as an axle drive device which drives left and right axles 10 by power of the rotary electric machine 11, application of the rotary electric machine unit according to the present invention is not limited to the axle drive device.

[Case]

The case 20 according to the present embodiment has a substantially cylindrical shape centered on an axis of the axle 10. The case accommodates therein the rotary electric machine 11, a speed reduction mechanism (not shown) which reduces rotary power output from the rotary electric machine 11, and a differential mechanism (not shown) which allows a rotational difference between the left and right axles 10 while transmitting the rotary power output from the speed reduction mechanism to the left and right axles 10.

An upper surface 21 of the case 20 on which the power control unit 30 is mounted is provided with a case-side connector 22 which is electrically connected to a unit-side connector 32 provided on a bottom surface 31 of the power control unit 30, positioning holes 23 into which positioning pins 33 extending downward from the bottom surface 31 of the power control unit 30 are inserted, case-side fastening portions 24 to which unit-side fastening portions 34 arranged at four corners of the power control unit 30 are fastened via bolts B1, and refrigerant pipe connecting portions 25, 26 to which a refrigerant pipe P is connected.

[Power Control Unit]

The power control unit 30 according to the present embodiment accommodates, in a box body 35 having a substantially rectangular parallelepiped shape, an inverter 12 (refer to FIGS. 5A and 5B) which is connected between a battery (not shown) and the rotary electric machine 11 and converts a direct current voltage to an alternating voltage or an alternating current voltage to a direct current voltage, and a control unit (not shown) which controls the inverter 12. The bottom surface 31 of the box body 35 is provided with the unit-side connector 32 and the positioning pins 33, and the four corners of the box body 35 is provided with the unit-side fastening portions 34.

Positions of the power control unit 30 according to the present embodiment in a left-right direction and a front-rear direction with respect to the case 20 are defined by inserting the positioning pins 33 extending downward from the bottom surface 31 into the positioning holes 23 of the case 20. When the bottom surface 31 of the power control unit 30 is pressed against the upper surface 21 of the case 20 in this state, the unit-side connector 32 provided on the bottom surface 31 is electrically connected to the case-side connector 22 provided on the upper surface 21 of the case 20. Subsequently, the power control unit 30 is directly mounted on the upper surface 21 of the case 20 by fastening the unit-side fastening portions 34 arranged at the four corners to the case-side fastening portions 24 arranged on the upper surface 21 of the case 20 via the bolts B1.

Figure 5A:
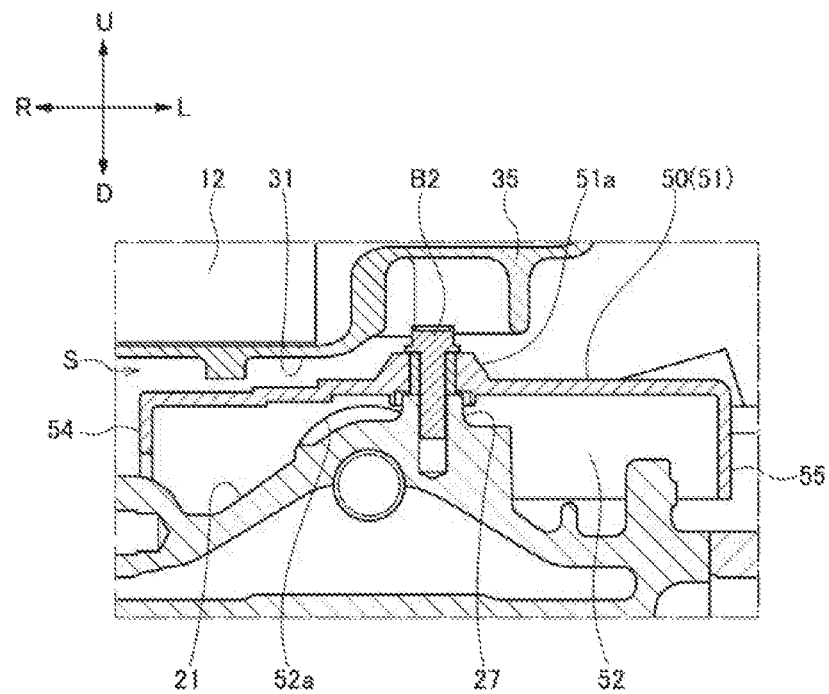
FIG. 5A is a partial sectional view (omitting the sound absorbing body) taken along a line A-A in FIG. 2.
Figure 5B:
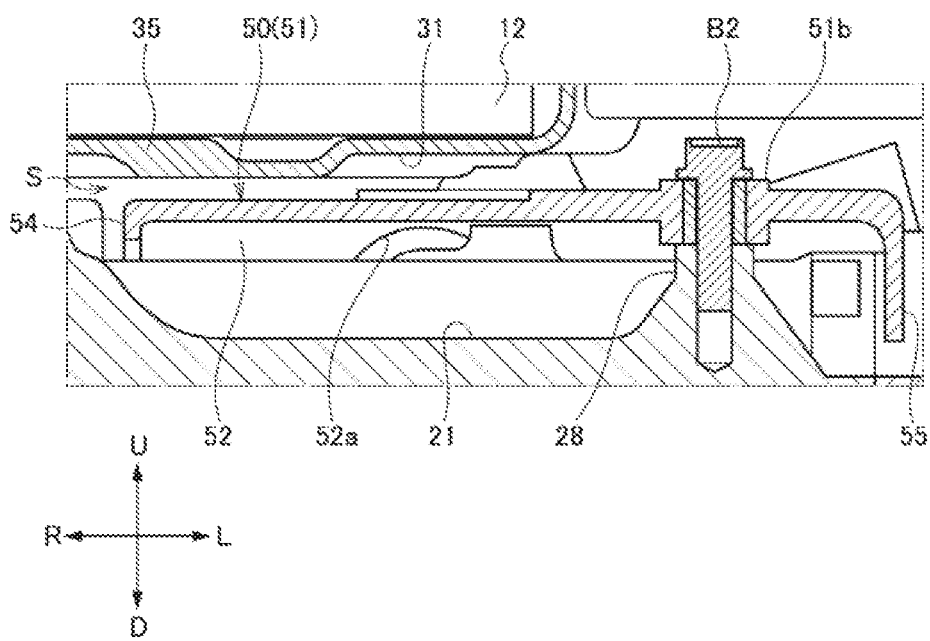
FIG. 5B is a partial sectional view (omitting the sound absorbing body) taken along a line B-B in FIG. 2.

In the rotary electric machine unit 100, as shown in FIGS. 5A and 5B, due to shapes of the upper surface 21 of the case 20 and the bottom surface 31 of the power control unit 30, a space S is generated between the upper surface 21 of the case 20 and the bottom surface 31 of the power control unit 30. For example, in the rotary electric machine unit 100 according to the present embodiment, the bottom surface 31 of the power control unit 30 is a substantially flat surface, whereas the upper surface 21 of the case 20 is a circumferential surface centered on the axis of the axle 10, and therefore, the space S having a non-uniform vertical width is formed. When the space S exists between the upper surface 21 of the case 20 and the bottom surface 31 of the power control unit 30, radiation sound of the rotary electric machine 11 may resonate between the upper surface 21 of the case 20 and the bottom surface 31 of the power control unit 30, and the radiation sound may be amplified.

The rotary electric machine unit 100 according to the present embodiment includes a sound absorbing member 40 provided between the upper surface 21 of the case 20 and the bottom surface 31 of the power control unit 30 in order to suppress the radiation sound of the rotary electric machine 11 from resonating between the upper surface 21 of the case 20 and the bottom surface 31 of the power control unit 30 and suppress the radiation sound from being amplified by the resonance in the configuration in which the power control unit 30 is mounted on the case 20 accommodating the rotary electric machine 11. Hereinafter, the sound absorbing member 40 according to the present embodiment will be described with reference to FIGS. 1 to 6B.

[Sound Absorbing Member]

As shown in FIGS. 1 to 6B, the sound absorbing member 40 according to the present embodiment includes a resin partition cover 50 separating the bottom surface 31 of the power control unit 30 from the upper surface 21 of the case 20, and a sound absorbing body 60 provided between the partition cover 50 and the upper surface 21 of the case 20.

The partition cover 50 includes an upper plate 51 formed along the bottom surface 31 of the power control unit 30, and side plates 52 to 55 extending from an outer edge portion of the upper plate 51 toward the upper surface 21 of the case 20 and having lower edge portions along the upper surface 21 of the case 20.

The upper plate 51 has a plurality of (two in the present embodiment) cover-side fastening portions 51a, 51b. The cover-side fastening portions 51a, 51b are fastened to case-side fastening portions 27, 28 provided on the upper surface 21 of the case 20 via bolts B2, so that the partition cover 50 (the sound absorbing member 40) is held on the upper surface 21 of the case 20. The power control unit 30 is mounted on the upper surface 21 of the case 20 after the sound absorbing member 40 is attached to the upper surface 21 of the case 20. As shown in FIGS. 5A and 5B, the bottom surface 31 of the power control unit 30 and the partition cover 50 (the upper plate 51) of the sound absorbing member 40 are in a non-contact state in which they are spaced apart from each other at a predetermined interval.

The lower edge portions of the side plates 52 to 55 are in a non-contact state spaced apart from the upper surface 21 of the case 20 at predetermined intervals along the upper surface 21 of the case 20. Specifically, among the side plates 52 to 55, the lower edge portions of first and second side plates 52, 53 along an axial direction of the axle 10 are formed into a substantially linear shape since they extend along the axial direction of the cylindrical case 20, and the lower edge portions of third and fourth side plates 54, 55 along a direction orthogonal to the axis of the axle 10 are formed into a substantially arc shape since they extend along a circumferential direction of the cylindrical case 20. The lower edge portion of the first side plate 52 is formed into the substantially linear shape, but a portion of the lower edge portion of the first side plate 52 is partially non-linear by a cutout portion 52a formed so as to avoid the refrigerant pipe P extending laterally from the upper surface 21 of the case 20. Accordingly, the lower edge portion of the first side plate 52 can approach the upper surface 21 of the case 20 as much as possible while avoiding the refrigerant pipe P.

The sound absorbing body 60 is a member having a sound absorbing property and flexibility and is held in a contact state between the upper surface 21 of the case 20 and the partition cover 50. According to the sound absorbing member 40, the partition cover 50 is held while the upper plate 51 in a non-contact state with the bottom surface 31 of the power control unit 30, and the lower edge portions of the side plates 52 to 55 are in a non-contact state with the upper surface 21 of the case 20, and the sound absorbing body 60 is held in contact with the upper surface 21 of the case 20. Therefore, transmission of vibration to the partition cover 50 can be suppressed while absorbing the radiation sound from the rotary electric machine 11. For example, the sound absorbing body 60 may be Thinsulate (registered trademark) manufactured by 3M Co., Ltd., urethane mat, nonwoven fabric or the like.

Figure 4:
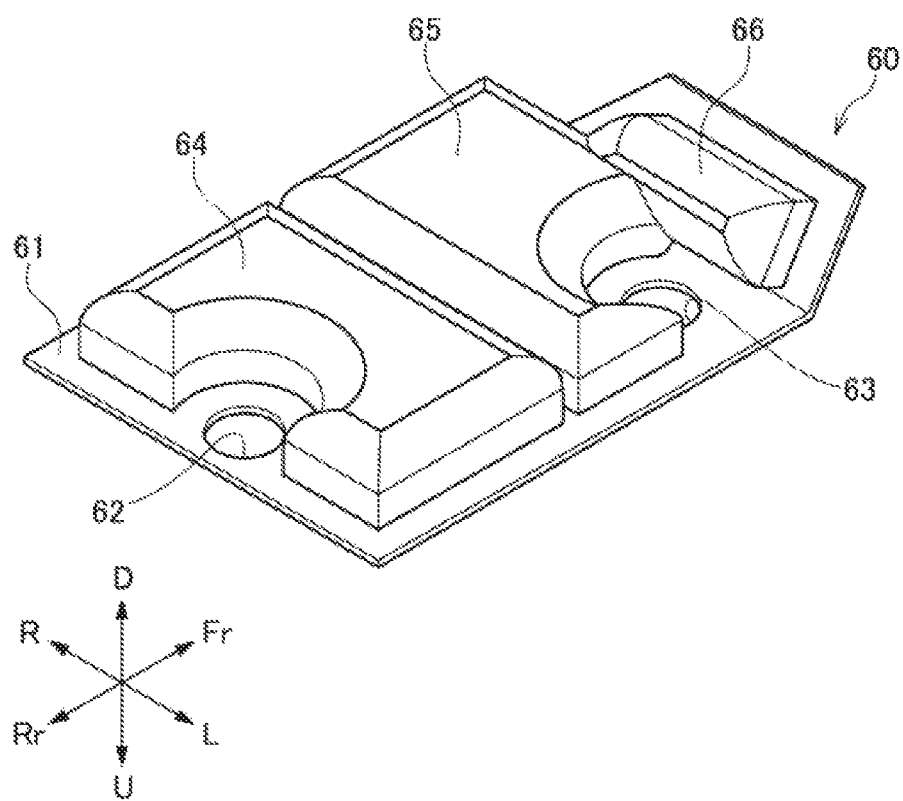
FIG. 4 is a perspective view of a sound absorbing body of the sound absorbing member in FIG. 2 as seen from a rear left lower side.
Figure 6A:
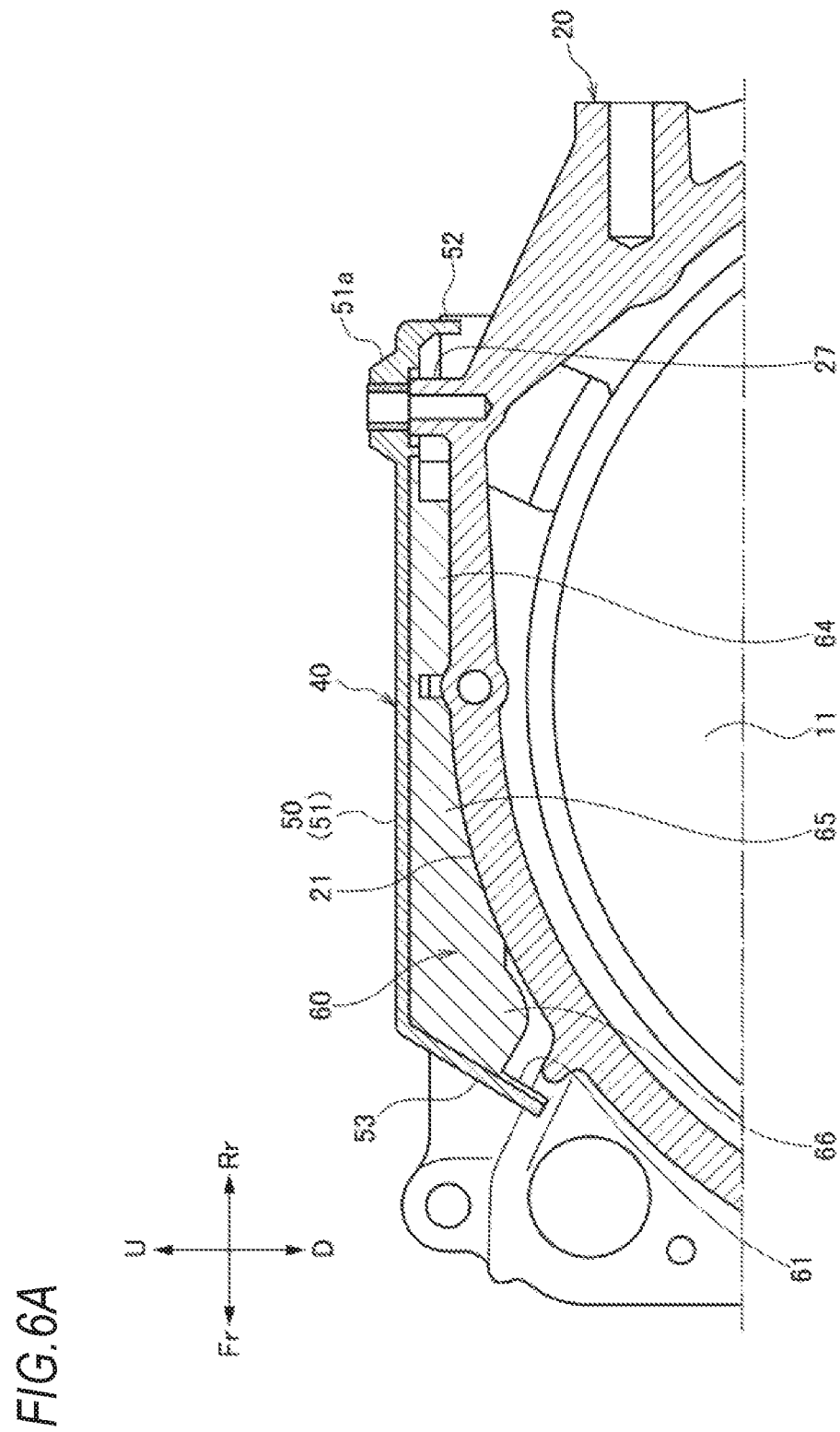
FIG. 6A is a partial sectional view taken along a line C-C in FIG. 2.
Figure 6B:
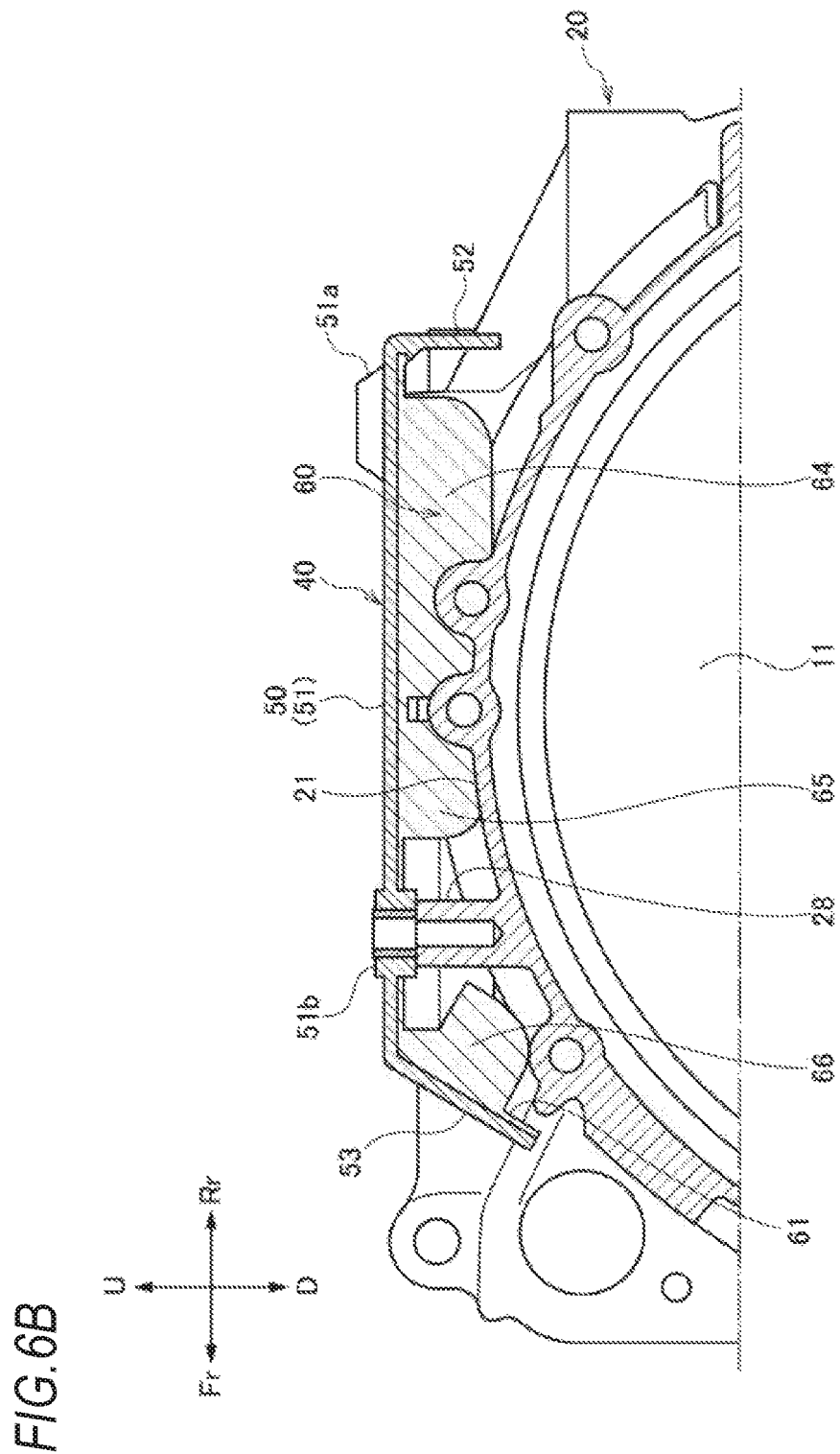
FIG. 6B is a partial sectional view taken along a line D-D in FIG. 2.

As shown in FIG. 4, the sound absorbing body 60 according to the present embodiment includes a seat portion 61 along an inner surface (lower surface) of the partition cover 50, a plurality of (two in the present embodiment) bolt through-holes 62, 63 formed into the seat portion 61, and a plurality of bulging portions 64 to 66 which bulge downward from the seat portion 61 so as to avoid positions of the bolt through-holes 62, 63. As shown in FIGS. 6A and 6B, the sound absorbing body 60 is provided along the lower surface of the partition cover 50 and fastened to the upper surface 21 of the case 20 (the case-side fastening portions 27, 28)

together with the partition cover 50 by the bolts B2 penetrating the bolt through-holes 62, 63. Accordingly, the partition cover 50 and the sound absorbing body 60 which are constituent elements of the sound absorbing member 40 can be positioned at the case 20 with a small number of components.

The bulging portions 64 to 66 of the sound absorbing body 60 fastened to the upper surface 21 of the case 20 together with the partition cover 50 are compressed between the partition cover 50 and the upper surface 21 of the case 20, and deform along the upper surface 21 of the case 20 so as to come into contact with the upper surface 21 of the case 20. Particularly, since the sound absorbing body 60 according to the present embodiment includes the plurality of bulging portions 64 to 66 arranged in the circumferential direction of the case 20, the sound absorbing body 60 is easy to deform along a circumferential surface of the case 20 and can come into close contact with a uneven portion existing on the upper surface 21 of the case 20.

Incidentally, the above-described embodiment may be appropriately modified, improved, or the like.

For example, in the above-described embodiment, the sound absorbing body 60 is fastened to the case 20 together with the partition cover 50 by the bolts B2. However, the present invention is not limited thereto, and the sound absorbing body 60 may be fixed to the partition cover 50 by adhesion, welding, or the like. Accordingly, the sound absorbing body 60 and the partition cover 50 can be handled as an integrated structure, and a handling property are improved.

In the meantime, at least the following matters are described in the present specification. Although the corresponding constituent elements or the like in the above-described embodiment are shown in parentheses, the present invention is not limited thereto.

(1) A rotary electric machine unit (rotary electric machine unit 100) including: a rotary electric machine (rotary electric machine 11);

a case (case 20) accommodating the rotary electric machine:

a power control unit (power control unit 30) configured to control the rotary electric machine and mounted on the case by directly connecting a unit-side connector (unit-side connector 32) provided on a bottom surface (bottom surface 31) of the power control unit to a case-side connector (case-side connector 22) provided on an upper surface (upper surface 21) of the case; and a sound absorbing member (sound absorbing member 40) provided between the upper surface of the case and the bottom surface of the power control unit.

According to (1), the power control unit is mounted on the case of the rotary electric machine by directly connecting the unit-side connector provided on the bottom surface of the power control unit to the case-side connector provided on the upper surface of the case. Therefore, the power control unit and the rotary electric machine can be arranged close to each other, and a three-phase cable connecting the case-side connector and the unit-side connector can be not necessary.

The sound absorbing member is provided between the upper surface of the case and the bottom surface of the power control unit. Therefore, radiation sound of the rotary electric machine can be suppressed from resonating between the upper surface of the case and the bottom surface of the power control unit and the radiation sound can be suppressed from being amplified.

(2) The rotary electric machine unit according to (1), wherein the sound absorbing member includes:

a resin partition cover (partition cover 50) separating the bottom surface of the power control unit from the upper surface of the case; and a sound absorbing body (sound absorbing body 60) provided between the partition cover and the upper surface of the case.

According to (2), the sound absorbing member includes the resin partition cover separating the bottom surface of the power control unit from the upper surface of the case, and the sound absorbing body provided between the partition cover and the upper surface of the case. Therefore, the radiation sound from the rotary electric machine is reduced by the sound absorbing body and the partition cover.

(3) The rotary electric machine unit according to (2), wherein the partition cover includes;

an upper plate (upper plate 51) formed along the bottom surface of the power control unit; and a side plate (side plates 52 to 55) extending from an outer edge portion of the upper plate toward the upper surface of the case and having a lower edge portion along the upper surface of the case, wherein the upper plate is held in a non-contact state with the bottom surface of the power control unit, wherein the lower edge portion of the side plate is held in a non-contact state with the upper surface of the case, and wherein the sound absorbing body is held in contact with the upper surface of the case.

According to (3), the partition cover is held while the upper plate is in the non-contact state with the bottom surface of the power control unit, and the lower edge portion of the side plate is in the non-contact state with the upper surface of the case, and the sound absorbing body is held in contact with the upper surface of the case. Therefore, transmission of vibration to the partition cover can be suppressed while absorbing the radiation sound from the rotary electric machine.

(4) The rotary electric machine unit according to (3), wherein the side plate is formed with a cutout portion (cutout portion 52a) so as to avoid a refrigerant pipe (refrigerant pipe P) extending from the case.

According to (4), the side plate is formed with the cutout portion so as to avoid a refrigerant pipe extending from the case. Therefore, the side plate can approach the upper surface of the case as much as possible while avoiding the refrigerant pipe.

(5) The rotary electric machine unit according to any one of (2) to (4), wherein the sound absorbing body is fastened to the upper surface of the case together with the partition cover.

According to (5), the sound absorbing body is fastened to the upper surface of the case together with the upper plate. Therefore, the sound absorbing member can be positioned at the case with a small number of components.

The invention claimed is:

1. A rotary electric machine unit comprising:
a rotary electric machine;
a case accommodating the rotary electric machine;
a power control unit configured to control the rotary electric machine and mounted on the case by directly connecting a unit-side connector provided on a bottom surface of the power control unit to a case-side connector provided on an upper surface of the case; and
a sound absorbing member provided between the upper surface of the case and the bottom surface of the power control unit.

2. The rotary electric machine unit according to claim 1, wherein the sound absorbing member includes:

a resin partition cover separating the bottom surface of the power control unit from the upper surface of the case; and a sound absorbing body provided between the partition cover and the upper surface of the case.

3. The rotary electric machine unit according to claim 2, wherein the partition cover includes:

an upper plate formed along the bottom surface of the power control unit; and a side plate extending from an outer edge portion of the upper plate toward the upper surface of the case and having a lower edge portion along the upper surface of the case, wherein the upper plate is held in a non-contact state with the bottom surface of the power control unit, wherein the lower edge portion of the side plate is held in a non-contact state with the upper surface of the case, and wherein the sound absorbing body is held in contact with the upper surface of the case.

4. The rotary electric machine unit according to claim 3, wherein the side plate is formed with a cutout portion so as to avoid a refrigerant pipe extending from the case.

5. The rotary electric machine unit according to claim 2, wherein the sound absorbing body is fastened to the upper surface of the case together with the partition cover.

\* \* \* \* \*